United States Patent [19]
Kuchibhotla

[11] Patent Number: 5,731,835
[45] Date of Patent: Mar. 24, 1998

[54] DYNAMIC CODING RATE CONTROL IN A BLOCK-BASED VIDEO CODING SYSTEM

[75] Inventor: Prashanth Kuchibhotla, Yardley, Pa.

[73] Assignee: David Sarnoff Research Center, Inc., Princeton, N.J.

[21] Appl. No.: 606,622

[22] Filed: Feb. 26, 1996

[51] Int. Cl.⁶ .................................................... H04N 7/12
[52] U.S. Cl. ........................ 348/390; 348/405; 348/415; 348/416; 348/699
[58] Field of Search ............................... 348/390, 405, 348/411, 415, 416, 699

[56] References Cited

U.S. PATENT DOCUMENTS

| | | | |
|---|---|---|---|
| 5,134,476 | 7/1992 | Aravind et al. | 348/415 |
| 5,231,484 | 7/1993 | Gonzales et al. | 348/405 |
| 5,253,059 | 10/1993 | Ansari et al. | 348/390 |
| 5,440,345 | 8/1995 | Shimoda | 348/411 |
| 5,491,513 | 2/1996 | Wickstrom et al. | 348/390 |
| 5,576,767 | 11/1996 | Lee et al. | 348/413 |
| 5,594,504 | 1/1997 | Ebrahimi | 348/416 |

*Primary Examiner*—Tommy P. Chin
*Assistant Examiner*—Frank Snow
*Attorney, Agent, or Firm*—William J. Burke

[57] ABSTRACT

A dynamic rate controller for a block-based video coding system. The rate controller is responsive to a scene cut flag generated by a scene cut detector. Once a scene cut flag is detected, the rate controller adjusts the bit budget for the frame following the scene cut before coding begins on that frame. Additionally, the rate controller establishes an optimal bit utilization profile that is compared to actual bit utilization, such that the bit allocation can be optimized as coding progresses.

20 Claims, 4 Drawing Sheets

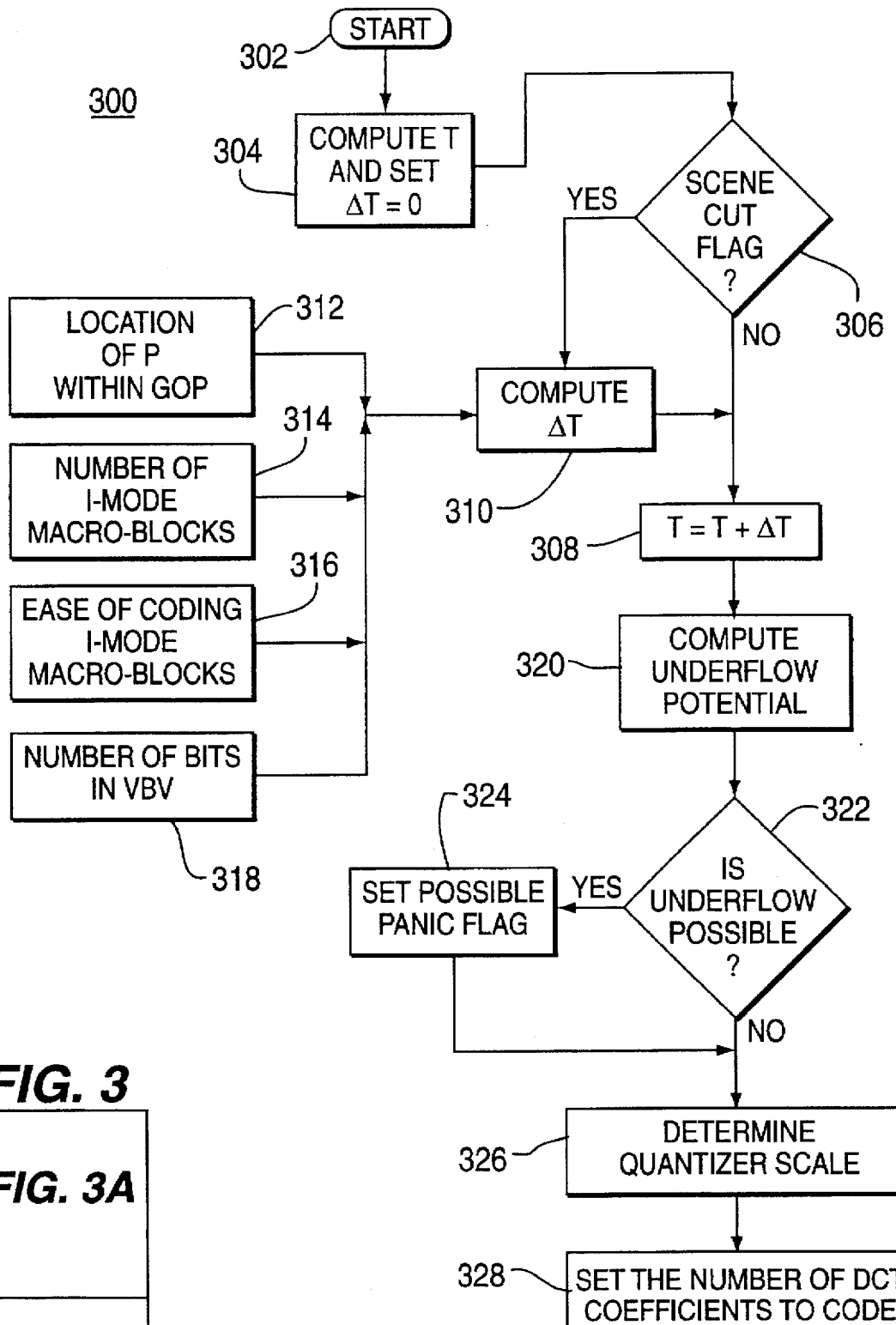

DYNAMIC CODING RATE CONTROL IN A BLOCK-BASED VIDEO CODING SYSTEM

The invention relates to a block-based video coding technique, and more particularly, the invention relates to a method and apparatus for dynamically controlling the coding rate of a block-based video coding system.

BACKGROUND OF THE DISCLOSURE

Block-based video coding systems typically use a coding technique that takes advantage of both spacial and temporal redundancy within an image (intra-picture) and between images (inter-picture) within a sequence of images. Such block-based image coding systems include those that utilize the well-known Moving Pictures Experts Group (MPEG) standard of video coding, namely, ISO/IEC International Standards 11172-2 (1994) (generally referred to as MPEG-1), and 13818-2 (Jan. 20, 1995 draft) (generally referred to as MPEG-2). To take advantage of the redundancies in an input video sequence and efficiently code a video sequence into a transmittable bitstream, block-based coding techniques assume that the sequential pictures within an input video sequence contain substantially similar information, i.e., the imaged scene changes very little from picture to picture. A scene cut occurring in the picture sequence violates the underlying assumption for efficient coding. Consequently, after a scene change (scene cut), a block-based coding technique must use a substantial number of bits to code the first picture following the scene change. Because of the number of bits available to code any one image is typically limited, a scene cut can cause substantial errors in the coding and lead to substantial distortion of the decoded picture.

In block-based video coding systems, there is generally a rate control algorithm or process which controls several aspects of the coding process. The primary task of the rate control process is to maintain a constant output bit rate into the transmission channel. The constant bit rate must be maintained even though the encoding rate may vary significantly, depending on the content of each image and the sequence of images.

Another important aspect of a rate control process is to insure that the bit stream produced by the encoder does not overflow or underflow the decoder's input buffer. Overflow and underflow control is accomplished by maintaining and monitoring a virtual buffer within the encoder. This virtual buffer is known as the video buffering verifier (VBV). To ensure proper decoder input buffer bit control, the encoder's rate control process establishes for each picture, and also for each macroblock of pixels comprising each picture, a bit quota (also referred to herein as a bit budget). By coding the blocks and the overall picture using respective numbers of bits that are within the respective bit budgets, the VBV does not overflow or underflow. Since the VBV mirrors the operation of the decoder's input buffer, if the VBV does not underflow or overflow, then neither will the decoder's input buffer.

To accomplish such buffer control, the rate controller makes the standard assumption in video coding that the current picture looks somewhat similar to the previous picture. If this assumption is true, the blocks of pixels in the picture are motion compensated by the coding technique and, once compensated, require very few bits to encode. This method works very well, as long as the actual number of bits needed to code the picture is near the target number of bits assigned to the picture, i.e., that the number of bits actually used is within the bit quota for that picture.

However, this assumption is invalid when a scene cut occurs or there is a substantial difference between the previous image and the current image. Since motion compensation has little benefit when two consecutive images are substantially different, the blocks are coded using an interim mode coding technique, which requires a much larger number of bits to code any one picture or block of pixels. In such situations, the bit budget for the picture is generally exceeded. Consequently, the picture quality for the next few pictures is substantially compromised, and there is a very good chance that the VBV may become very close to an underflow condition. Consequently, when the VBV is about to underflow, and there are no more bits allocated to enable the rate controller to code the last few blocks remaining to be coded in the picture, the block-based video coding system is generally said to have attained a "panic" state. To avoid a panic state, the prior art generally utilizes a very large buffering system. Such a buffer is expensive and adds complexity to the overall block-based video coding system.

Therefore, a need exists in the art for a method and apparatus that dynamically controls the encoding process, such that the occurrence of scene cuts or other substantial scene changes between two consecutive images do not generate a panic state or otherwise underflow or overflow the VBV.

SUMMARY OF THE INVENTION

The disadvantages heretofore associated with the prior art are overcome by the present invention of a dynamic rate controller for a block-based video coding system. The rate controller is responsive to a scene cut flag generated by a scene cut detector. Once a scene cut flag is detected, the rate controller adjusts the bit budget for the frame following the scene cut before coding begins on that frame. Additionally, the rate controller establishes an optimal bit utilization profile that is compared to actual bit utilization, such that the bit allocation can be optimized as coding progresses.

BRIEF DESCRIPTION OF THE DRAWINGS

The teachings of the present invention can be readily understood by considering the following detailed description in conjunction with the accompanying drawings, in which:

FIG. 3 depicts the proper alignment of FIGS. 3A and 3B; and

FIGS. 3A and 3B together depict a detailed flow diagram illustrating operation of the dynamic rate controller of the present invention.

To facilitate understanding, identical reference numerals have been used, where possible, to designate identical elements that are common to the figures.

DETAILED DESCRIPTION

Figure 1:
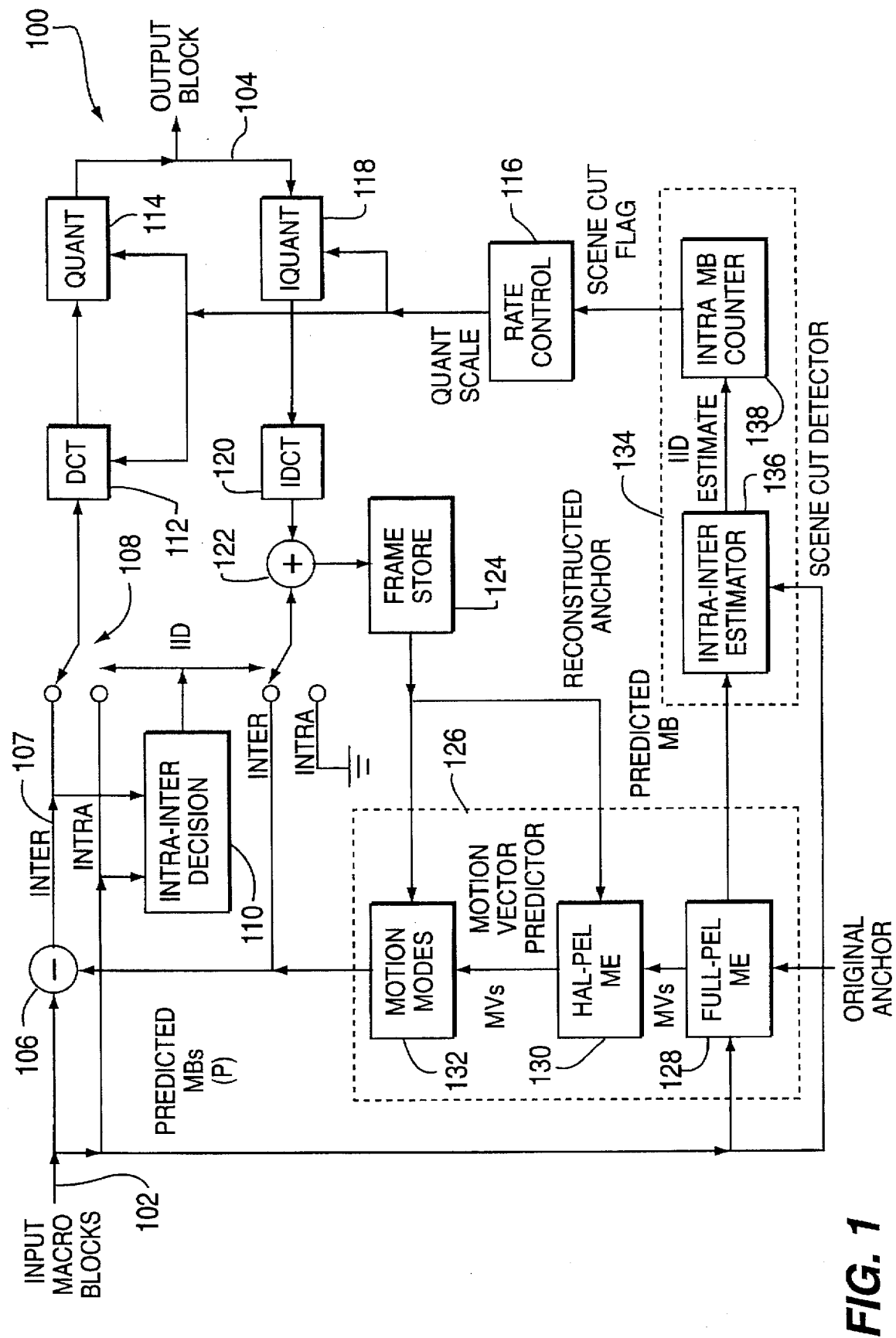
FIG. 1 depicts a block diagram of a block-based coding system incorporating the dynamic rate controller of the present invention.

FIG. 1 depicts a block diagram of a block-based coding system 100 (specifically, an MPEG encoder) incorporating the present invention. The input signal, at port 102, to the system is assumed to be a preprocessed image that has been partitioned into a plurality of blocks, where the blocks are sequentially provided as an input to the system. Under the MPEG standard, these blocks of pixels are commonly known as macroblocks, e.g., a 16×16 pixel block. The following disclosure uses the MPEG standard terminology; however, it should be understood that the term macroblock is intended to describe a block of pixels of any size that is used for the basis of motion compensation.

The system computes, from the system output signal, a series of predicted macroblocks (P). Each predicted macroblock is illustratively produced by decoding the output signal, at port 104, just as the receiver of the transmitted output signal would decode the received signal. Subtractor 106 generates, on path 107, a residual signal (also referred to in the art as simply the residual or the residual macroblock) by subtracting the predicted macroblock from the input macroblock.

If the predicted macroblock is substantially similar to the input macroblock, the residuals are relatively small and are easily coded using very few bits. In such a scenario, the input macroblock is said to be motion compensated. However, if the difference between the predicted macroblock and the input macroblock is substantial, the residuals are difficult to code. Consequently, the system is better off directly coding the input macroblock in lieu of coding the motion compensated residual macroblock. This selection is known as a selection of the coding mode. Coding the input macroblock (I) is referred to as intra-coding, while coding the residuals is referred to as inter-coding. The selection between these two modes is known as the Intra-Inter-Decision (IID).

The IID is made by the IID circuit 110, which sets the coding mode switch 108. The IID is computed by first computing the variance of the residual macroblock (Var R) and the variance of the input macroblock (Var I). The coding decision is based on these values. There are several functions that can be used to make this decision. For example, using the simplest function, if Var R is less than Var I, the IID selects the Intermode. Conversely, if Var I is less than Var R, the IID selects the Intramode.

The selected block is processed in a discrete cosine transform (DCT) block 112. The DCT produces coefficients representing the input signal to the DCT. The quantizer 114 quantizes the coefficients to produce the output block at port 104. The dynamic rate controller 116 of the present invention controls the quantization scale (step size) used to quantize the coefficients. Optionally, the rate controller also controls the number of DCT coefficients that are coded by the system. The details of the rate control block are discussed with respect to FIG. 3 below.

To produce correct predicted blocks and to accomplish efficient half-pel motion vector generation, the encoder needs access to the decoded images. In order to accomplish such access, the quantizer 114 output is passed through both the inverse quantizer 118 and inverse DCT 120. The output of the inverse DCT is ideally identical to the input to the DCT 112. In the inter-mode, the decoded macroblock is produced by summing the output of the inverse DCT and the predicted macroblock. During the intra-mode, the decoded macroblock is simply the output of the inverse DCT. The decoded macroblocks are then stored in the frame store 124. The frame store accumulates a plurality of these "reconstructed" macroblocks that constitute an entire reconstructed frame of image information. The motion vector predictor 126 uses the reconstructed frame to produce motion vectors that are used in generating predicted macroblocks for forthcoming input images.

To generate motion vectors, the motion vector predictor 126 comprises three components: a full-pel motion estimator 128, a half-pel motion estimator 130, and a motion mode block 132. The full-pel motion estimator 128 is a "coarse" motion vector generator that searches for a coarse match between a macroblock in a previous image and the present input macroblock. The previous image is referred to as an anchor image. Under the MPEG standards, the anchor image is what is known as an I or P frame within an image sequence known as a Group Of Pictures (GOP). The motion vector is a vector representing the relative position where a coarse match was found between the two macroblocks. The coarse motion vector generator produces a motion vector that is accurate to one picture element (pel).

The accuracy of the full-pel motion estimator is improved in the half-pel motion estimator. The half-pel estimator uses the full-pel motion vectors and the reconstructed macroblocks from the frame store 124 to compute motion vectors to half-pel accuracy. The half-pel motion vectors are then sent to the motion modes block 132. Typically, there are multiple motion vectors related to each macroblock. The modes block 132 selects the best motion vector for representing motion for each input macroblock.

The full-pel estimator is a computationally intensive task compared to the half-pel estimator. For this reason, in several implementations, it is computed separately on dedicated hardware. Often, all the full-pel motion vectors are computed before half-pel processing begins.

The MPEG encoder system discussed above is a conventional system that is available as a set of integrated circuits as model L64120 from LSI Logic, Inc. of Milpitas, Calif. Importantly, this MPEG encoder stores an entire frame of full-pel motion vectors before the half-pel estimator begins operation.

The concepts of Motion Estimation and Motion Compensation are based on an underlying assumption that the current picture is not very different from a previously occurring picture (the anchor image). However, when a substantial scene change (also called a scene cut) occurs, the anchor pictures are substantially different from the current picture. Hence, the predicted macroblocks are very inaccurate and the residuals are large. As such, for most input macroblocks of a picture, the IID selects the input macroblock (intra-mode) for coding in lieu of coding the residuals (inter-mode). It should be noted that this coding decision occurs even in the case where there is no scene change, and that a normally coded picture may contain a mixture of intra- and inter-coded macroblocks. However, the percentage of intra-coded macroblocks within a given picture significantly increases after a scene cut occurs. The scene cut detector of the present invention analyzes all the macroblocks in a picture and then determines whether a scene cut has occurred. This is accomplished by counting the number of intra-coded macroblocks and comparing the count to a threshold level. Specifically, if the percentage of intra-coded macroblocks in any given frame exceeds the threshold level, that frame is deemed to follow a scene cut.

In a typical MPEG encoder, the actual IID decision is made after the half-pel motion vectors are generated and best motion vector is chosen. Since the full-pel estimator 128 generates motion vectors for the entire frame before the first macroblock is coded by the encoder, the inventive scene cut detector apparatus 134 monitoring these full-pel results is able to produce an IID estimate for all macroblocks, i.e., estimate that the IID would make when it does analyze the residuals. The scene cut detector comprises an IID estimator 136 connected in series to an intra-code macroblock counter 138. The counter 138 generates a scene cut decision (a flag)

indicating that the scene cut detector has determined that a scene cut has occurred.

This illustrative form of scene cut detector is described in detail in U.S. patent application Ser. No. 08/606,613, filed simultaneously herewith and incorporated herein by reference. In response to this scene cut indicator flag, the inventive dynamic rate controller adjusts the quantization scale of the quantizer, such that any possibility of a panic situation will be avoided. As such, the dynamic rate controller has been provided a coding flag which warns of the impending scene cut prior to the frame following the scene cut being encoded. As such, the dynamic rate controller can readjust the bit allocations and monitor bit usage closely to prevent the possibility of a very large bit usage and a panic situation.

Figure 2:
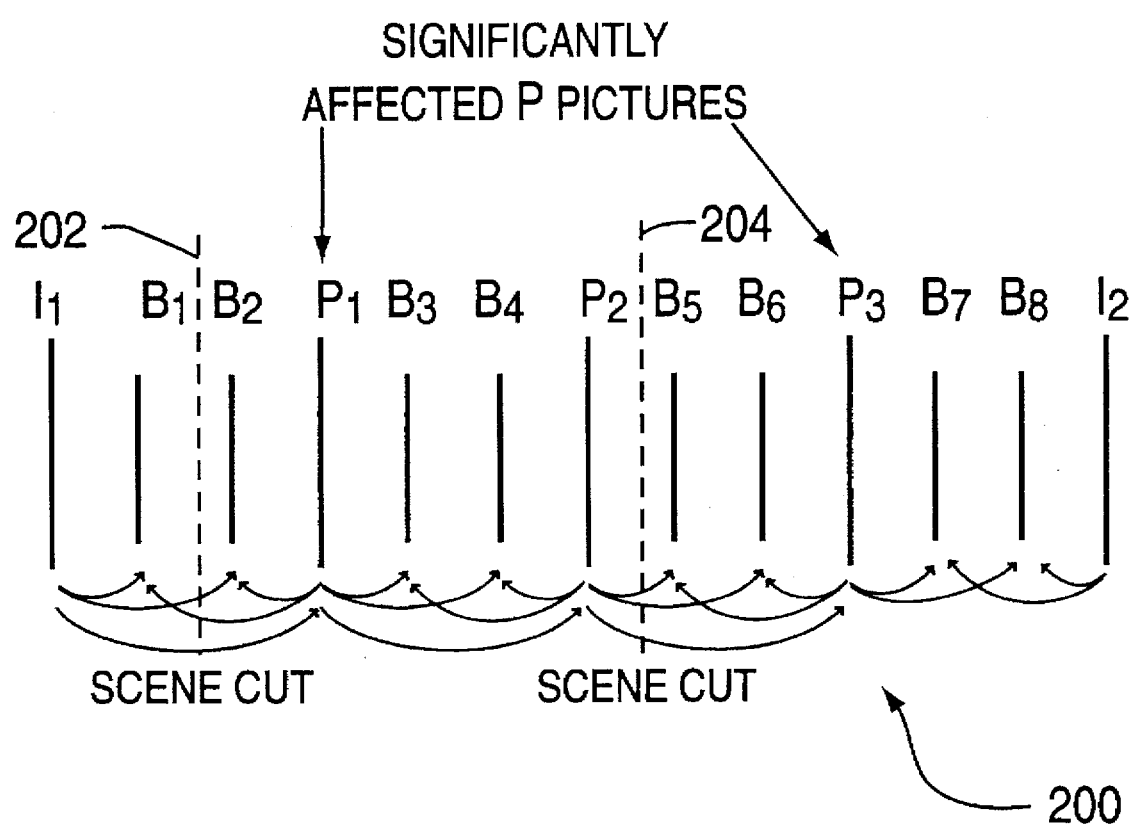
FIG. 2 illustrate the affect of scene cuts upon an MPEG Group of Pictures (GOP)

In operation, the dynamic rate controller 116 increases the bit allocation to the P picture, making sure that the new allocation does not underflow the buffer, and hence, maintain the picture quality. Under the MPEG Standard, it is desirable to have accurately coded P pictures because errors in P pictures tend to carry over into other P and B pictures that are subsequently coded. FIG. 2 illustrates the P pictures ($P_1$ and $P_3$) that are worst affected by scene cuts 202 and 204 within an MPEG Group of Pictures (GOP) 200. An increased P picture bit allocation that will avoid VBV underflow requires reducing the bits allocated to surrounding B pictures. The bit reduction can be safely spread out over several B pictures. Note that B picture errors do not carry over to any other pictures within the group of pictures.

Figure 3B:
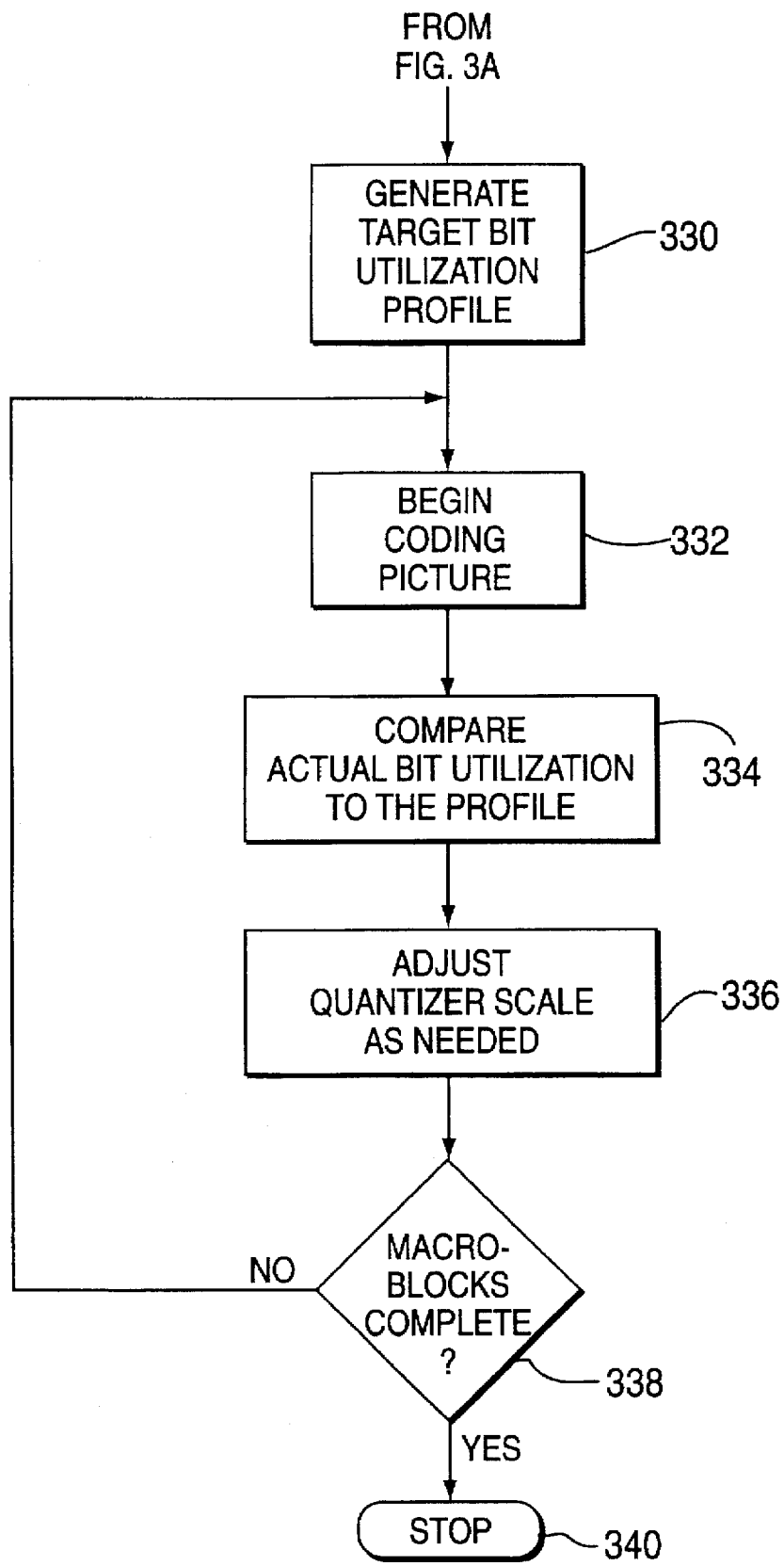

FIG. 3 depicts a detailed flow diagram illustrating the operation of the dynamic rate controller 116 of the present invention. The process 300 begins at start block 302 and proceeds to step 304, where the process computes a nominal number of bits (T) to use to code the present picture. Also, step 304 initializes the increased bit allocation ($\Delta T$) to zero. At step 306, the process queries whether a scene cut flag has been issued by the scene cut detector. If the query is negatively answered, the process continues to step 308 where the present picture is coded with T bits (e.g., the nominal number of bits). Conversely, if the scene cut flag is detected, the process proceeds from step 306 to step 310. At step 310, the process computes an increase ($\Delta T$) for the bit allocation (T). The bit allocation increase is dependent upon several factors including: 1) the distance of the P picture that is about to be coded from the end of the group of pictures; 2) the number of I-mode macroblocks in the P picture; 3) ease of coding the I-mode macroblocks; and 4) the number of bits presently in the VBV. This information is stored in various registers within the rate controller and are shown respectively as blocks 312, 314, 316 and 318 in FIG. 3. Each of the factors used to compute $\Delta T$ are discussed in detail below.

More specifically, if the first P picture in the new scene is close to the end of the group of pictures, the rate controller does not require an increase in the bit allocation for the P picture. As such, the bit allocation to the P picture is made proportional to its distance from the I picture of the next group of pictures, i.e., the value of $\Delta T$ can be smaller as the P picture is closer to the end of the group of pictures.

For example, consider picture $P_3$ in FIG. 2 which is the last P picture in the GOP. This P picture is not used to predict any P pictures, and is used to predict only two B pictures that occurred just after the scene cut. This results in poor quality images for only the first two or three pictures in the new scene. Psycho-visual experiments have shown that the human eye has trouble adjusting quickly to a new scene and that even if the first two or three pictures of the new scene have poor quality, the distortion is not noticeable to the human eye. Note that the B pictures that follow $P_3$ are predicted from the I picture ($I_2$), and hence, do not suffer significant degradation because of the scene cut. As such, the $P_3$ picture can be poorly coded without significantly degrading other pictures. Therefore, $\Delta T$ is set to a relatively small value for P pictures occurring near the end of a GOP.

Because number of intra-mode (I-mode) macroblocks in the P picture is known or estimated before the picture is coded, then $\Delta T$ can be made proportional to the percentage of intra-coded macroblocks in the picture. In some scene cuts, the new scene is so easy to code, i.e., it takes very few bits to code, that the actual number of bits used may be even less than the target bit allocation. If it is determined beforehand that the new scene may be as easy to code as intra-mode macroblocks, the increase ($\Delta T$) can be small. For example, this can be accomplished by analyzing the variances of the macroblocks within the picture that is about to be coded and determining how easy the picture will be to code.

Another constraint on the size of $\Delta T$ is the number of bits in the VBV. The buffer will underflow if T plus $\Delta T$ exceeds the number of bits in the VBV. Thus, $\Delta T$ is defined depending on the potential for underflow. This potential for buffer underflow is easily computed by taking the difference between the number of bits in the VBV and the value of $(T+\Delta T)$. Then, the value of $\Delta T$ is adjusted to avoid a negative (−) valued difference. At step 308, the nominal bit allocation T is increased by bit allocation increase $\Delta T$, e.g., $T=T+\Delta T$. At step 320, the process computes the potential for underflow using the present value of $\Delta T$. This step compares the VBV size with the current buffer fullness for this value of T increased by the value of $\Delta T$. If the expected buffer fullness will come close to exceeding the VBV size, then the query at step 322 is affirmatively answered, and the process, at step 324, sets a possible underflow flag (also referred to as a possible panic flag). A possible underflow flag indicates that there is a potential that during the coding of the present picture that a panic situation may result. If a panic situation is not deemed imminent, the query at step 322 is negatively answered, and the process proceeds along the NO path to step 326.

At step 326, based on the value of $\Delta T$, the process determines an initial quantizer scale that is intended to avoid underflowing the VBV. At step 328, the process establishes a number of DCT coefficients that will be coded at the initial quantizer scale. As discussed below, both the quantizer scale and the number of DCT coefficients that are coded are adjustable such that VBV underflow can be avoided.

At step 330, the process generates a target bit utilization profile. Generally this utilization profile is pre-defined depending on the type of picture that is being coded, i.e., whether it is a P picture, a B picture or an I picture. Typically, the utilization profile is linear across the entire picture coding. Alternatively, the profile may be non-linear allowing for more or less bits to be used at some points in the image than at other points. As such, the center of any given picture may be allocated more bits or a finer quantization scale than are allocated to outer lying areas of the picture. Another alternative is to dynamically generate the target bit utilization profile by using information gathered from coding previous pictures of the same type. For example, the actual target bit profile that is used to code the previous P picture may be used as the target bit utilization profile for the present P picture. Once the target bit utilization profile is generated, at step 332, the process begins coding the picture. As the picture is coded at step 334, the actual bit utilization is compared to the target bit utilization profile after each macroblock is coded. At step 336, the process adjusts the quantizer scale as needed to ensure that the actual bit utilization conforms to the target bit utilization profile. The speed at which the adjustment of the quantizer scale is accomplished can be varied depending upon the difference between the actual bit utilization profile and the target bit utilization profile. In other words, the response could be fast for large differences between the two profiles, or slowed for smaller differences between the two profiles. The response speed also may depend upon whether the potential panic flag is set. For example, if both the potential panic flag and the scene cut flag are set, the number of bits used to code the next picture must be strictly controlled or an underflow situation is possible. Thus, when both these flags are set, the invention strictly controls bit utilization and the response speed of the quantization scale changes. In addition to adjusting the quantizer scale, the DCT coefficients that are coded can be changed as well. For example, if the actual bit utilization profile begins to substantially diverge from the target bit utilization profile and it is expected that the actual bit utilization will exceed the VBV (i.e., the potential panic flag is set). The higher ordered DCT coefficients can be dropped and not coded. The number of DCT coefficients that are coded will depend upon the degree to which the target bit utilization profile will be exceeded. Typically, the number of DCT coefficients is only adjusted when both the possible panic flag is set in step 324 and a scene cut flag is identified in step 306.

At step 338, the process queries whether all of the macroblocks for the present picture have been coded. If the query is negatively answered, the process continues along the NO path to step 332 where the next macroblock is coded. If the query in step 338 is affirmatively answered, the process continues to step 340 where the coding process is stopped.

Importantly, the foregoing rate control process attempts to equalize the overall quality of each of the pictures in a sequence. As such, the rate control process attempts to distribute errors throughout a number of images rather than have a substantial number of errors in any one image. Furthermore, the inventive rate controller attempts to maintain the quality of different regions within a picture constant, such that within a given image, when coded, coding errors and anomalies do not all appear in one region of the image.

Although a single embodiment which incorporated the teachings of the present invention has been shown and described in detail herein, those skilled in the art can readily devise many other varied embodiments that still incorporate these teachings.

What is claimed is:

1. In a block-based video coding system, a method for performing dynamic rate control in response to a substantial difference between a first image and a second image, where said first image and said second image are two sequential images in a sequence of images, said method comprising the steps of:

detecting said substantial difference between said first image and said second image;

computing a bit allocation increase value;

increasing the nominal bit allocation associated with said second image by the bit allocation increase value to produce an increased bit allocation; and determining a quantizer scale for coding said second image within the increased bit allocation.

2. The method of claim 1 further comprising the steps of:
   generating a target bit utilization profile;
   coding a plurality of macroblocks of said second image;
   comparing the bit utilization profile to an actual number of bits used to code each of the macroblocks; and
   adjusting the quantizer scale to cause the actual number of bits utilized to code the macroblocks to approximate the bit utilization profile.

3. The method of claim 1 further comprising the step of establishing a number of discrete cosine transform coefficients for coding said second image within the increased bit allocation.

4. The method of claim 2 further comprising the steps of:
   determining a decoder buffer underflow potential; and
   if a decoder buffer underflow potential is determined, setting a possible underflow flag.

5. The method of claim 4 wherein the quantizer scale adjusting step is performed at a first speed and, when the possible underflow flag is set, the quantizer adjusting step is performed at a second speed.

6. The method of claim 4 wherein, if the comparing step determines that a difference between the bit utilization profile and the actual number of bits used exceeds a threshold and the possible underflow flag is set, the method further comprises the step of reducing a number of discrete cosine transform coefficients for coding said second image.

7. The method of claim 1 wherein said step of computing said bit allocation increase further comprises the step of adjusting the bit allocation increase depending upon a location of the second image within a group of pictures.

8. The method of claim 1 wherein said step of computing said bit allocation increase further comprises the step of adjusting the bit allocation increase depending upon an estimated number of intra-mode coded macroblocks contained within said second image.

9. The method of claim 1 wherein said step of computing said bit allocation increase further comprises the step of adjusting the bit allocation increase depending upon the estimated ease of coding intra-mode macroblocks within said second image.

10. The method of claim 1 wherein said step of computing said bit allocation increase further comprises the step of adjusting the bit allocation increase depending upon a number of bits in a virtual buffer verifier.

11. In a block-based video coding system, apparatus for performing dynamic rate control in response to a substantial difference between a first image and a second image, where said first image and said second image are two sequential images in a sequence of images, said apparatus comprising:

means for detecting said substantial difference between said first image and said second image;

means for computing a bit allocation increase value;

means, connected to said computing means, for increasing the nominal bit allocation for said picture associated with said second image by the bit allocation increase value to produce an increased bit allocation; and means, connected to said increasing means, for determining a quantizer scale for coding the second image within the increased bit allocation.

12. The apparatus of claim 11 further comprising:
   means for generating a target bit utilization profile;
   means for coding a plurality of macroblocks of said second image;
   means for comparing the bit utilization profile to an actual number of bits used to code each of the macroblocks; and means for adjusting the quantizer scale to cause the actual number of bits utilized to code the macroblocks to approximate the bit utilization profile.

13. The apparatus of claim 11 further comprising means for establishing a number of discrete cosine transform coefficients for coding said second image within the increased bit allocation.

14. The apparatus of claim 12 further comprising:

means for detecting a potential buffer underflow condition by determining a decoder buffer underflow potential, and, if a decoder buffer underflow potential is determined, setting a possible underflow flag.

15. The apparatus of claim 14 wherein the quantizer scale adjustment is performed at a first speed and, when the possible underflow flag is set, the quantizer adjustment is performed at a second speed.

16. The apparatus of claim 14 wherein, if the comparing means determines that a difference between the bit utilization profile and the actual number of bits used exceeds a threshold and the possible underflow flag is set, a number of discrete cosine transform coefficients used for coding said second image is reduced.

17. The apparatus of claim 11 wherein the computing means further comprises means for adjusting the bit allocation increase depending upon a location of the second image within a group of pictures.

18. The apparatus of claim 11 wherein said computing means further comprises means for adjusting the bit allocation increase depending upon an estimated number of intra-mode coded macroblocks contained within said second image.

19. The apparatus of claim 11 wherein said computing means further comprises means for adjusting the bit allocation increase depending upon the estimated ease of coding intra-mode macroblocks within said second image.

20. The apparatus of claim 11 wherein said computing means further comprises means for adjusting the bit allocation increase depending upon a number of bits in a virtual buffer verifier.

\* \* \* \* \*